Dec. 26, 1950     C. MARSHALL     2,535,365

STERILIZER

Filed June 28, 1945     2 Sheets-Sheet 1

Inventor
Charles Marshall
By Nobie & Bastuen
Attorneys

Dec. 26, 1950  C. MARSHALL  2,535,365
STERILIZER

Filed June 28, 1945  2 Sheets-Sheet 2

Inventor
Charles Marshall
By Robie & Bastien
Attorneys

Patented Dec. 26, 1950

2,535,365

UNITED STATES PATENT OFFICE 2,535,365

STERILIZER

Charles Marshall, London, England

Application June 28, 1945, Serial No. 601,991
In Great Britain December 31, 1943

Section 1, Public Law 690, August 8, 1946
Patent expires December 31, 1963

1 Claim. (Cl. 21—100)

This invention relates to a sterilizer for surgical or dental instruments and similar small articles. One object of the invention is to combine as one apparatus a sterilizing chamber and a tray for holding articles in said sterilizing chamber and from bringing them when required into a readily accessible position. Another object is to combine with a chamber for sterilizing by water another chamber for sterilizing and lubricating by oil.

The sterilizer is illustrated in the accompanying drawings in which.

Figure 1:
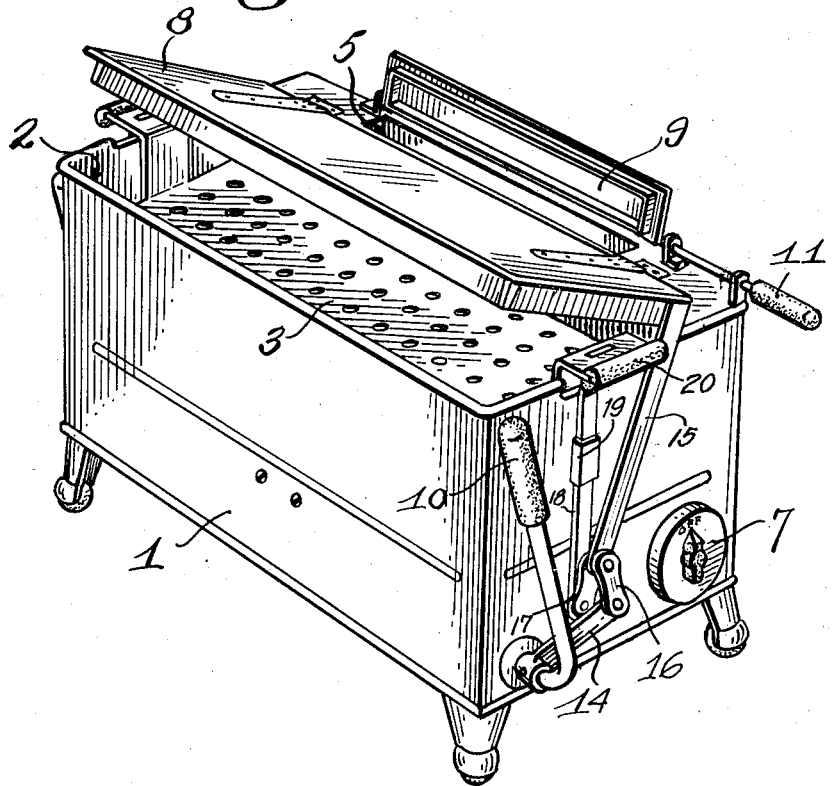
Figure 1 is a perspective view.
Figure 2:
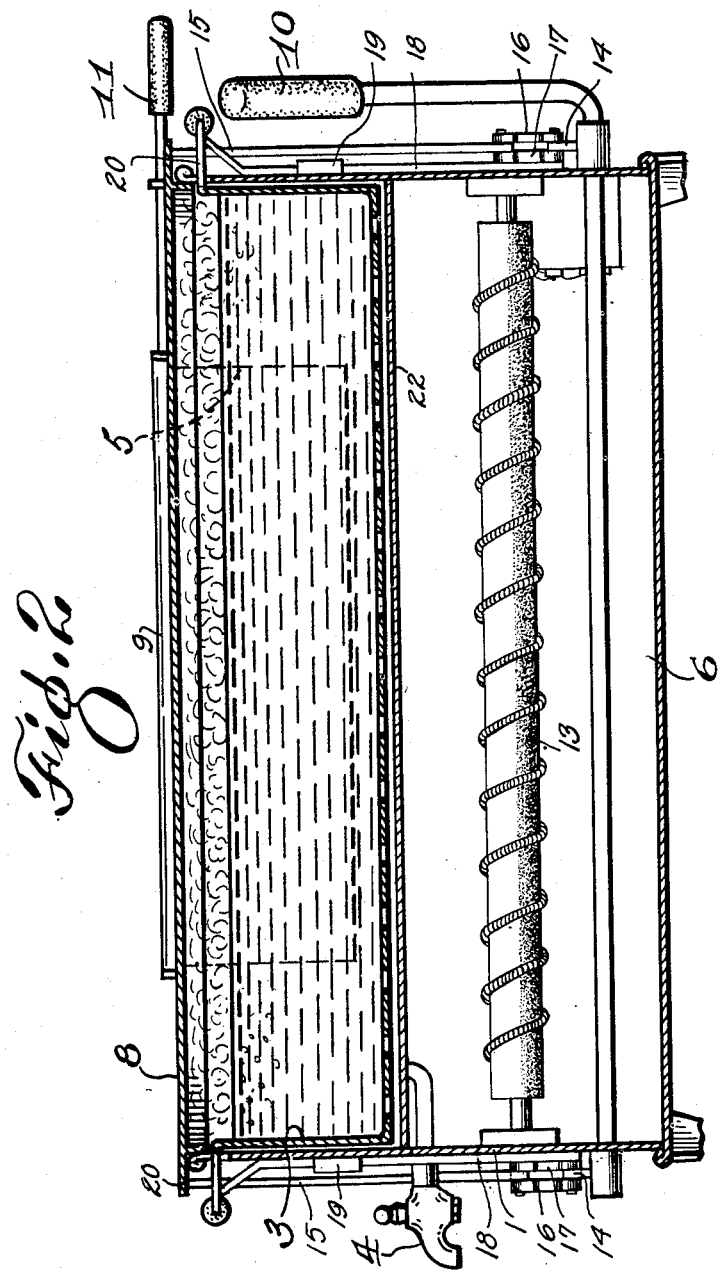
Figure 2 is a sectional view.

As shown in the drawings the sterilizer comprises a metal casing 1, having a water chamber 2, containing a perforated instrument tray 3. At the bottom of chamber 2, a cock 4, is provided by means of which water filled into the chamber may be discharged. Partly immerged into the water chamber 2 is a built-in oil chamber or tank 5, for sterilizing and lubricating dental-handpieces and/or surgical instruments.

Placed under the chambers 2 and 5 and separated therefrom by a partition 22 is a lower chamber 6, in which the heating elements 13 are mounted. The amount of electrical current passing through the heating elements 13 may be controlled by a conventional three-way switch 7 and, if desired, by an automatic cut-out (not shown).

The chambers 2 and 5 are provided with hinged lids 8 and 9 respectively, the lid 8 being actuated by means of an operating lever 10 and the lid 9 simply by rotating the arm 11 secured to the hinged part of said lid 9.

The lever 10 is pivotally secured to the lower side of the casing 1 and, being provided with a pivoted lever 14, actuates the arm 15 to which it is connected by means of a link 16, while the other end of the arm 15 is secured to the side of the lid. The arm 15 is also intermediately connected by means of a link 17 to a bar 18 slidably engaging, on the side of the casing 1, a guide 19. The result of this arrangement is that when the lever 10 is pivoted, the arm 15 is actuated and lifts the lid 8 and at the same time, the arm 18 moves upwardly, presses against the outwardly projecting handles 20 of the perforated tray 3 and thereby elevates said tray. A similar arrangement is provided on the other side of the casing wherein the elements 14, 15, 16, 17, 18 and 19 are duplicated in identical relationship. The operating lever 10, however, is not duplicated but is nevertheless connected to the pivoted lever 14 of the other side of the casing 1 by means of a shaft 21 passing through the lower part of the heating chamber 6.

In using the sterilizer it will be understood that surgical instruments carried on the tray 3, are immersed in water heated to boiling point by the heating elements in chamber 6, and that the oil chamber 5, is heated by the boiling water in chamber 2. Thus dental handpieces and/or surgical instruments immersed in the oil chamber 5, are sterilized and lubricated.

When instruments in water chamber 2, are required for use, the lid 8, is opened, and tray 3, is lifted clear of the water, the required instruments are then withdrawn and the lid closed. When instruments in the oil chamber 5, are required for use the lid 9, is opened and instruments lifted out with a sterilizing-forceps and the lid closed. The oil chamber 5, can also be fitted with an instrument-tray and lifting-device if so required.

Although not illustrated in detail in the accompanying drawings, it will be understood that the oil chamber 5 may consist of a removable tank or reservoir so as to facilitate periodical cleaning, also this chamber can be made in various dimensions according to the wishes of the individual practitioner.

The sterilizer may be manufactured from copper and brass.

I claim:

In a sterilizer of the character described having a sterilizing chamber and an instrument tray adapted to be raised and lowered therein, a hinged cover to close the chamber, an arm secured to the side of said cover, a crank pivoted to the chamber, a hand lever projecting from said crank for actuating same, a link connecting the free ends of both the crank and arm, a vertically guided bar on both sides of the chamber for raising the tray, a second link connecting together the lower end of the bar and the free end of the arm, angularly bent handles on the sides of the tray, said handles projecting outside the chamber, said chamber being notched for allowing passage of the handles for closing the cover, the guided bar acting on said handles for raising the tray, and an extension on the hand lever extending to both sides of the chamber for operating simultaneously the cover and tray actuating mechanisms on both sides of the chamber.

CHARLES MARSHALL.

REFERENCES CITED

The following references are of record in the file of this patent:

UNITED STATES PATENTS

| Number | Name | Date |
|---|---|---|
| 763,936 | Stilwell | June 28, 1904 |
| 1,939,713 | Meitzler | Dec. 19, 1933 |
| 2,173,733 | Seybert | Sept. 19, 1939 |
| 2,230,238 | Duberstein et al. | Feb. 4, 1941 |
| 2,302,698 | Kessel | Nov. 24, 1942 |

FOREIGN PATENTS

| Number | Country | Date |
|---|---|---|
| 277,801 | Italy | Sept. 19, 1930 |